May 24, 1927.
W. O. SHADBOLT ET AL
1,629,543
VEHICLE
Filed Aug. 23, 1923   4 Sheets-Sheet 4
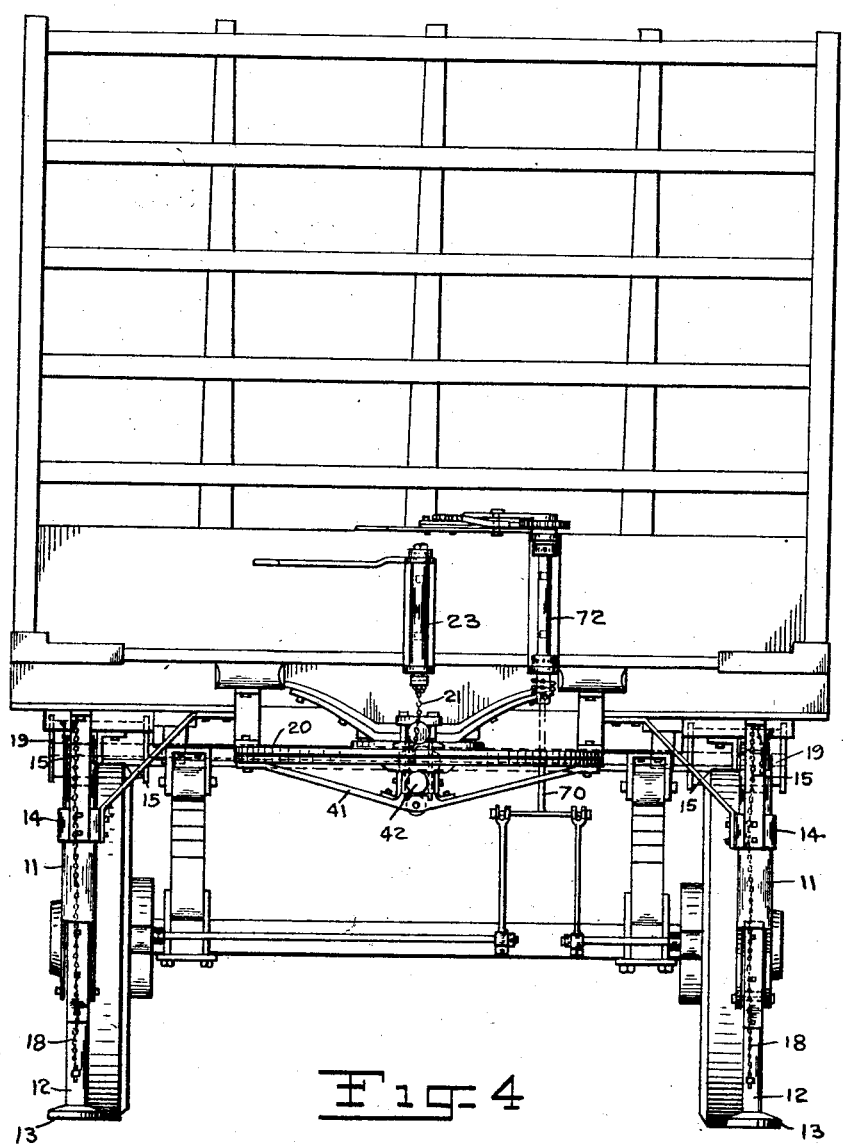

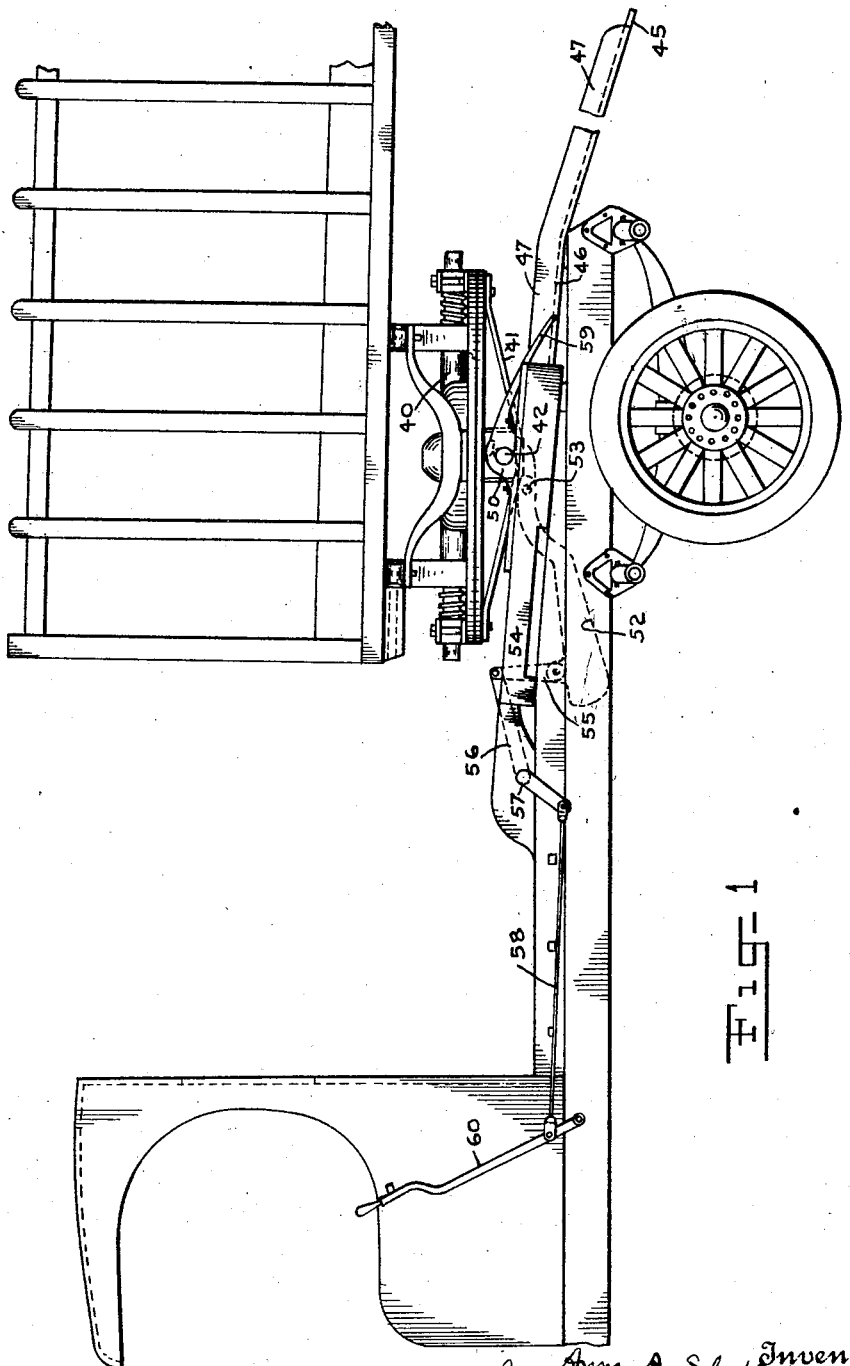

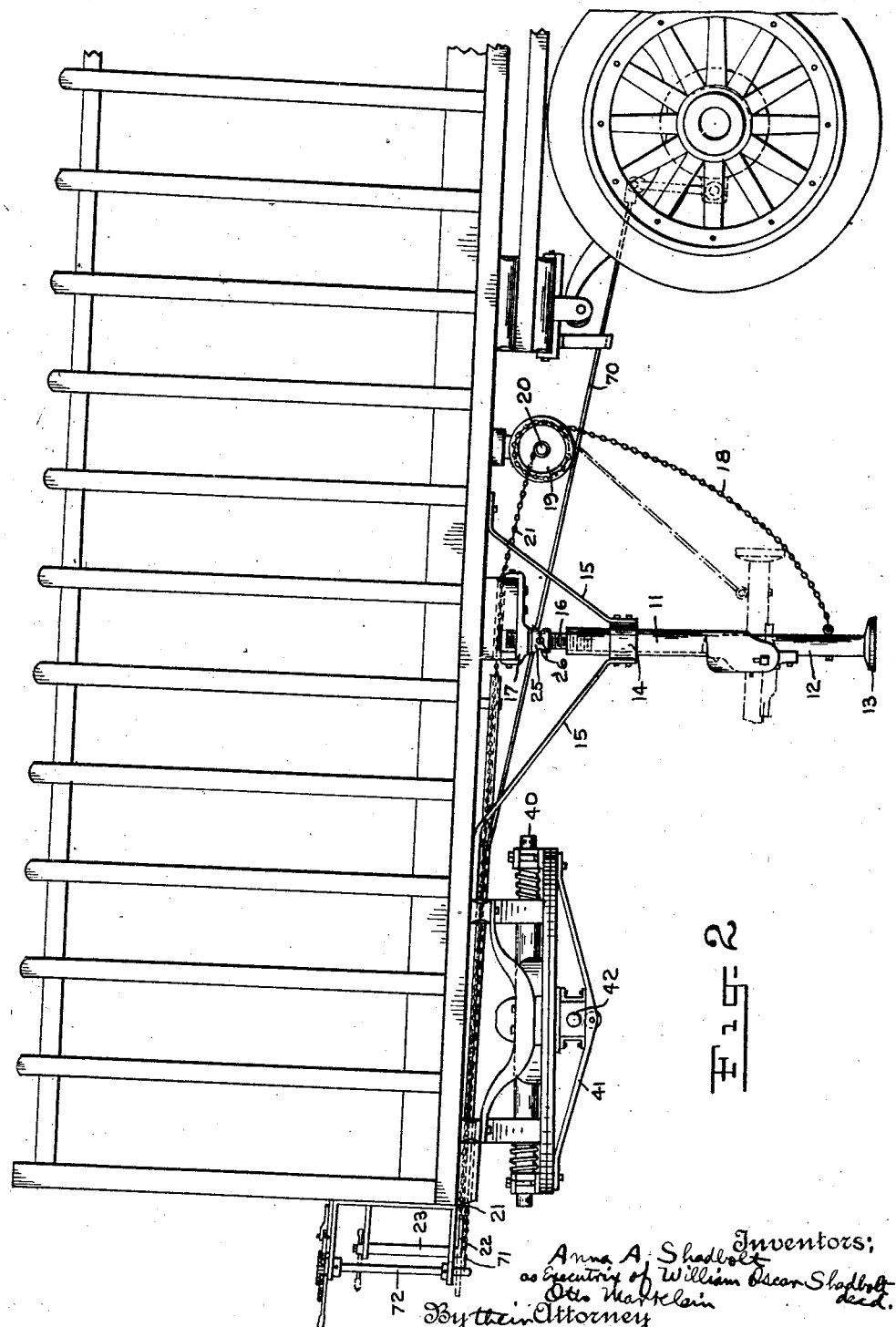

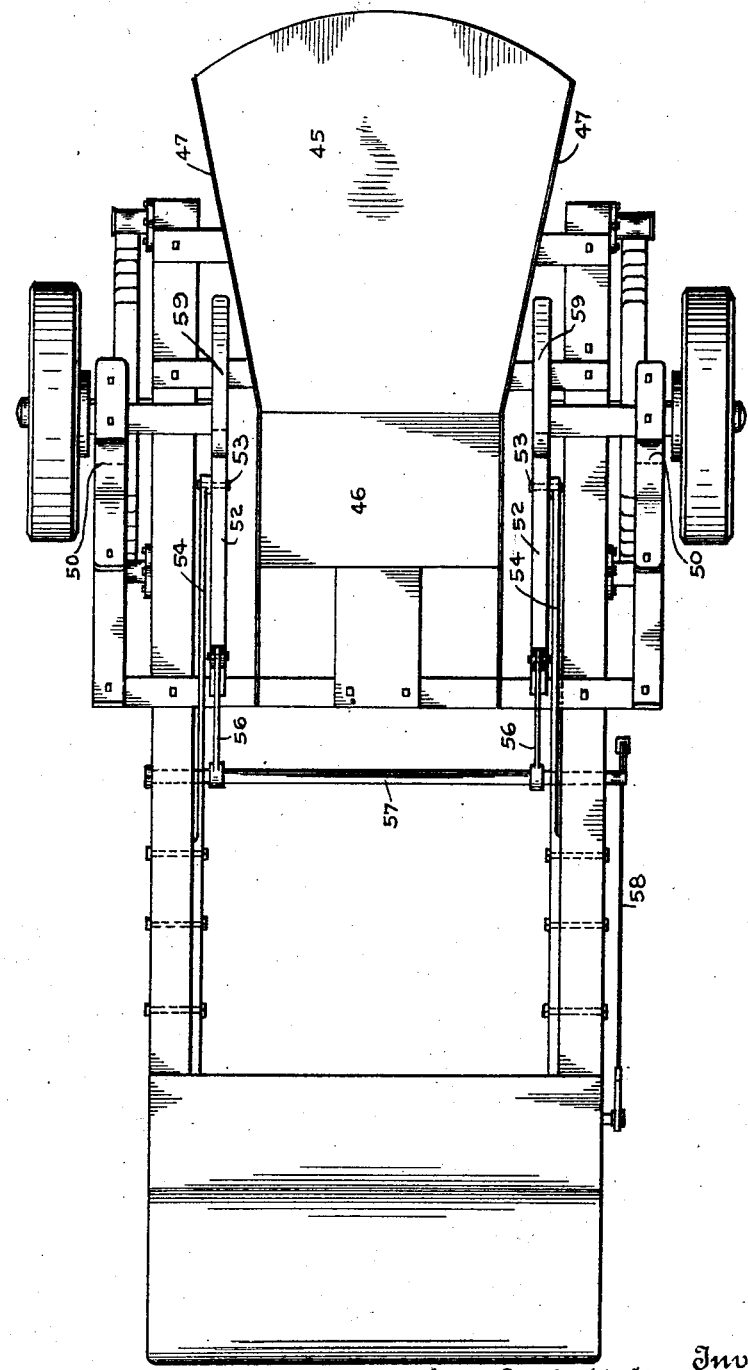

Patented May 24, 1927.

1,629,543

UNITED STATES PATENT OFFICE.

WILLIAM OSCAR SHADBOLT, DECEASED, LATE OF BROOKLYN, NEW YORK; BY ANNA A. SHADBOLT, EXECUTRIX, OF BROOKLYN, NEW YORK, AND OTTO MARKLEIN, OF BROOKLYN, NEW YORK; SAID MARKLEIN ASSIGNOR OF HIS INTEREST TO SAID ANNA A. SHADBOLT AS EXECUTRIX.

VEHICLE.

Application filed August 23, 1923. Serial No. 658,952.

This application is a continuation in part of application by William Oscar Shadbolt and Otto Marklein filed February 15, 1922, Serial No. 536,772.

The invention relates to tractors, trailers, and means for coupling the same together, and more especially, among other things, to improved details of construction of such tractors and trailers and of coupling means therefor, which adapt them to be easily and quickly coupled together and uncoupled when desired, and also means for supporting the front end of the trailer and adapted to be brought into use when the tractor is uncoupled and removed from underneath the front end of the trailer and to be easily placed in an inoperative position when the tractor is coupled with the trailer.

The object of the invention is to provide strong, simple and easily operated mechanism for the purposes above pointed out and others.

The invention consists in the novel construction, arrangement and combination of various devices, elements and parts, as hereinafter set forth in the claims hereof, one embodiment of the same being illustrated in the accompanying drawings and described in this specification.

In the said drawings,

Fig. 1 is a side elevation of a tractor and the forward part of a trailer, showing the devices for coupling the same together;

Fig. 2 is a side elevation of the trailer, showing the parts of the coupling means which are attached thereto, and also the means adapted to support the trailer when it is disengaged from the tractor;

Fig. 3 is a plan view of the rear portion of the tractor; and

Fig. 4 is a front view of the trailer and the coupling and supporting mechanism, the lower part of the fifth wheel structure being shown turned at right angles to its usual position.

In carrying the said invention into effect in the embodiment thereof which has been selected for description in this specification and illustrated in the accompanying drawings, there are provided a tractor and trailer, which may be of the usual or any suitable types such as are adapted to be coupled together and used in the manner contemplated by the present invention. It is not deemed necessary to describe the construction of either the tractor or the trailer, except in so far as the same relates to the means for coupling them together, uncoupling and disengaging them from each other when desired, and supporting the front portion of the trailer when the tractor is uncoupled and removed from under the same. The supporting means will first be described.

In Fig. 2 the trailer is shown supported by the means just referred to. Referring now more particularly to this Fig. 2 it will be observed that a pair of supporting members is provided, only one appearing in said Fig. 2, but both being shown in Fig. 4.

Each of the pair of supporting members comprises a leg, composed of two sections pivotally connected together. When the supporting devices are in use, upholding the forward portion of the trailer, they are in the position shown in the full lines in Fig. 2; when the trailer is supported on the tractor, as shown in Fig. 1, the lower members of the supporting legs are turned upwards as shown in the dotted lines in Fig. 2. In the drawings the upper members are designated 11, and the lower members 12, each of the lower members being preferably provided with a flattened end or foot 13. The upper members 11 are adapted to slide vertically in sleeves 14 attached to the floor of the trailer by securing and bracing members 15. The upper portions of the members 11 are bored out, or the entire length of the members may be tubular if desired, and the upper parts are internally screw-threaded to engage the lower ends of screw-threaded bolts 16, the other ends of which are inserted in sockets in securing members 17 which depend from the floor of the trailer. The screw-threaded bolts are provided with nuts 25 rigid therewith, and which bear against the socket-members 17; the nuts are provided with openings 26, adapted to receive a turning-pin or the like so that the bolts may be rotated and the supporting devices raised or lowered to some extent as desired. A chain 18 is attached to each of the lower swinging members 12, and passes upward to a corresponding drum 19 on the end of a shaft 20 suitably journaled beneath the floor of the trailer, there being one drum on each end of the shaft. Upon the shaft 20 intermediate the drums, is wound the end of a chain 21 which passes forward and is attached to a laterally extending arm or crank 22 at the lower end of a shaft 23 located at the forward end of the trailer.

The mechanism by means of which the tractor and trailer are coupled together will now be described. Underneath the front end of the trailer is provided a fifth wheel, which is preferably of the general type such as that shown in U. S. patent to Shadbolt, No. 1,099,152, but with some difference of construction to adapt it to the required use. Referring now more particularly to Figs. 1 and 2, it will be seen that the upper member is provided with a rod 40 extending longitudinally under the trailer body and pivotally connected therewith, so that the fifth wheel is adapted to swing with reference to the plane of the trailer on an axis longitudinal thereof. The lower member of the fifth wheel is, however, provided with an understructure 41 at each side, whereby the fifth wheel is adapted to swing with reference to the plane of the tractor on an axis transverse thereto. The lower member of the fifth wheel is also provided with laterally extending arms 42 which are adapted to engage with co-acting members on the tractor as hereinafter described.

In Figs. 1 and 2 of the drawings the lower member of the fifth wheel is shown in lateral view, in the position it occupies when the tractor and trailer are in line, the former pointing straight ahead, but in Fig. 4 the lower member of the fifth wheel is swung around about ninety degrees, as it would be if connected to a tractor standing at right angles to the trailer, consequently the understructures 41 and arms 42 appear in all these views.

Mounted upon the rear portion of the tractor is an inclined plane or slide, adapted to support the front end of the trailer. Referring now particularly to Figs. 1 and 3 it will be seen that the slide consists of a wider rear portion 45, narrowing toward the front part 46. Flanges 47 extend upward from each side edge, and while at the middle and forward portion of the slide they are just far enough apart to lie outside the understructure 41 of the fifth wheel, they are considerably farther apart at the rear end of the slide, so that when the tractor is backed under the fifth wheel, no very careful management or adjustment is required to cause the understructure 41 to be located between the guiding flanges 47, and as the backward motion of the tractor is continued, the front end of the trailer is lifted and the same moved sideways into the proper position by the action of the flanges 47 upon the understructure 41.

Referring now to Figs. 1 and 3 it will be seen that the rear end of the tractor is provided with devices for engaging with the rod 42 of the trailer fifth wheel. These devices in part comprise stationary stops 50 which engage the ends of the rod 42 and prevent same from passing further forward. These stops are provided with a socket or notch in their rear ends adapted to receive the rod 42, as is best shown in Fig. 1. The rod engaging devices on the tractor also comprise movable members adapted to pass up behind the rod 42 after it is in position against the stops 50, and hold it in position so that the tractor and trailer may be securely coupled together. These movable members comprise levers 52, pivotally secured at 53 to arms 54 secured to the tractor frame and hooked at their rear ends so as to engage the rod 42. The forward ends of the levers 52 are made heavy, so as to act as counterweights, tending to hold said levers always in operative position. To the forward ends of the levers are secured links 55, which in turn connect with arms 56 on a shaft 57 (see Fig. 3) which is operated by a rod 58 and the controlling-lever 60 placed adjacent the seat of the operator. Extending rearwardly from the hooked members 52 are guide members 59, which are adapted to receive the ends of the rod 42, and allow same to slide thereon into position to be engaged by the hooks above described, the said guide members 59 being depressed by the rod 42 as it slides thereover, and thereby depressing the hooks on the rear ends of the levers 52 so that the rod 42 passes along until it abuts against the stops 50, whereupon the hooks are raised by the action of the heavily counterweighted levers 52, the said hooks thereupon securely engaging the said rod 42.

Brake mechanism is indicated diagrammatically in Fig. 2, operatively connected with the trailer wheels and controlled by means of a rod 70, chain 71 and operating mechanism 72.

The operation of the invention is as follows: When the tractor and trailer are uncoupled and the former removed the trailer supporting device will be in its operative position as shown in full lines in Fig. 2, but when the front end of the trailer is supported by the tractor as shown in Fig. 1, said mechanism is drawn up into the position shown in dotted lines in Fig. 2. When the supporting mechanism is in operative position, the trailer will stand securely, being supported at four points, namely, the two rear wheels and two supporting members, and can be loaded or unloaded as desired. It will of course be understood that in such case, and particularly before backing the tractor to couple on the same, the trailer wheels should be blocked or brakes applied thereto, if any. When it is desired to move the trailer, the tractor is backed up under the front end of the trailer, and this backing motion is continued until the parts assume the position shown in Fig. 1. During the backing operation the wider back part of the tractor slide 45 passes under the understructure 41 of the trailer fifth wheel, and the flanges 47 guide the same into the proper medial position. As the backward motion of the tractor continues, the rods 42 which extend laterally from the fifth wheel pass over the guides 59 and abut against the stops 50, whereupon the hooked ends of the levers 52 are brought into engagement behind the rods 42, the tractor and trailer being thereby securely coupled together and ready for operation.

The advantages of the invention over devices previously known will be obvious from what has been above said regarding its construction and operation. Attention might also be called to the fact that in coupling the tractor to the trailer it is not necessary to back up the tractor in the direction of the length of the trailer, as the tractor can be backed up at a right angle or greater, it being only necessary to turn the fifth wheel sufficiently to permit the understructure 41 and rods 42 to properly engage with the guiding devices on the tractor.

The invention is not limited to the exact form of construction which has been shown and described, as it is obvious that various modifications can be made without departing from the spirit and scope of the invention.

Having thus described the invention, what we claim as new and desire to secure by Letters Patent is as follows:

1. The combination with a trailer truck comprising a body provided with a pair of rear wheels, a swingingly mounted support upon its forward portion adapted to support the same when standing alone, and devices upon its forward portion adapted to co-act in coupling said trailer to a tractor, said co-acting devices on the trailer comprising a fifth wheel provided with laterally extending arms; of a tractor provided with a portion adapted to be inserted under the front end of said trailer, lateral guides adapted to bring the trailer into proper lateral relation with the tractor when the tractor is introduced under the trailer, stops on said tractor against which said laterally extending arms are adapted to abut, and levers pivotally secured to said tractor, the rear ends of which are provided with hooks adapted to engage with said laterally extending arms when said levers are in one position and to be disengaged therefrom when said levers are in another position, the rear ends of said hooks being provided with rearwardly and downwardly extending members over which said laterally extending arms may pass, whereby said hooks are depressed, the ends of said levers opposite to said hooks being heavily counterweighted so as to cause said hooks to rise when permitted and thereby to engage with said laterally extending arms and to remain in such engaged and operative position.

2. The combination with a trailer truck comprising a body provided with a pair of rear wheels, a swingingly mounted support upon its forward portion adapted to support the same when standing alone, and devices upon its forward portion adapted to co-act in coupling said trailer to a tractor, said co-acting devices on the trailer comprising a fifth wheel provided with laterally extendings arms; of a tractor provided with a portion adapted to be inserted under the front end of said trailer, lateral guides adapted to bring the trailer into proper lateral relation with the tractor when the tractor is introduced under the trailer, stops on said tractor against which said laterally extending arms are adapted to abut, levers pivotally secured to said tractor, the rear ends of which are provided with hooks adapted to engage with said laterally extending arms when said levers are in one position and to be disengaged therefrom when said levers are in another position, the rear ends of said hooks being provided with rearwardly and downwardly extending members over which said laterally extending arms may pass, whereby said hooks are depressed, the ends of said levers opposite to said hooks being heavily counterweighted so as to cause said hooks to rise when permitted and thereby to engage with said laterally extending arms and to remain in such engaged and operative position, and means adapted to release said hooks from said laterally extending arms, comprising a rotatable shaft transverse to the tractor body, a pair of rearwardly extending arms fast on said shaft, a pair of links connecting the rear ends of said last mentioned arms with the forward ends of said hooked levers, and means adapted to rotate said transverse shaft, whereby the forward ends of said hooked levers may be elevated and the rearward hooked ends disengaged from said laterally extending arms.

In witness whereof the said ANNA A. SHADBOLT, as executrix of WILLIAM OSCAR SHADBOLT, deceased, and the said OTTO MARKLEIN, have signed their names to this specification and claims this 13th day of August, 1923.

ANNA A. SHADBOLT,
*As Executrix of William Oscar Shadbolt, Deceased.*

OTTO MARKLEIN.